April 5, 1960 F. M. SCHABAUER 2,931,981

VARIABLE PULSE DELAY APPARATUS

Filed Sept. 20, 1957 3 Sheets-Sheet 1

INVENTOR.
FRITZ M. SCHABAUER
BY Albert Reiss

ATTORNEY

April 5, 1960 F. M. SCHABAUER 2,931,981

VARIABLE PULSE DELAY APPARATUS

Filed Sept. 20, 1957 3 Sheets-Sheet 2

INVENTOR.
FRITZ M. SCHABAUER
BY
Albert Peiss
ATTORNEY

April 5, 1960

F. M. SCHABAUER 2,931,981

VARIABLE PULSE DELAY APPARATUS

Filed Sept. 20, 1957

3 Sheets-Sheet 3

INVENTOR.
FRITZ M. SCHABAUER

BY

Albert Sirro

ATTORNEY

United States Patent Office 2,931,981

Patented Apr. 5, 1960

2,931,981

VARIABLE PULSE DELAY APPARATUS

Fritz M. Schabauer, Bayshore, N.Y., assignor to Mackay Radio and Telegraph Company, New York, N.Y., a corporation of Delaware Application September 20, 1957, Serial No. 685,244

4 Claims. (Cl. 328—55)

The present invention relates to circuits for delaying electric pulses and more particularly to a circuit for producing large variable pulse delays.

In telegraph communications, it is sometimes necessary to have a network for producing large variable pulse delays. In multi-channel telegraph systems, for instance, where the outputs of several channels are to be combined and transmitted over a single transmission path, large time differentials exist between channels and which may vary in amount from a few milliseconds to as much as several seconds. This delay varies with the routing of a line carrying a channel, it being understood that the length of a line alters the electrical characteristics (such as capacity and inductance) thereof, and finally, the equipment connected to the line offers further inductive or capacitive reactance, each of which affect the delay time. Resonant filters, either low-pass or high-pass, are also responsible for pulse time delays since such filters consist of both iductance and capacity.

The invention consists of a circuit arrangement wherein an electrical pulse is applied to a pair of parallel channels from which a pair of control pulses are derived respectively; one control pulse being derived from the leading edge of the applied pulse and the other control pulse being derived from the trailing edge of the applied pulse, each channel comprising a variable delay device responsive to its control pulse, whereby a regenerator may be selectively switched on and off by said control pulses, the differential spacing between the control pulses being equal to the interval between the leading and trailing edges respectively of the applied pulse. The invention affords a wide range of delay times and furnishes a regenerated output pulse which has the same or opposite polarity as desired, and duration as the original applied pulse. The pulse delay time is continuously adjustable from a minimum which is only determined by the rise time and the degree of differentiation of a rectangular input pulse to a desired maximum sufficient to cater for normal pulse delays encountered in the telegraph art. The circuit of the invention is inserted between the frequency modulation demodulator (or amplifier-rectifier) and the channel combiner. It is also within the scope of the invention to insert the inventive circuit in each channel just ahead of the combiner and adjusting each unit until inequalities of time delay are corrected. To correct for time delays between two signals arriving over lines having different characteristics it is therefore necessary to delay the signal being received over the line having the least delay so that the arrival time of signals over both lines is synchronized. Accordingly, it is an object of the invention to provide a pulse delay network having a variable delay time.

It is a further object of this invention to provide a pulse delay network circuit having a delay time which is continuously adjustable from a minimum which is determined by the rise time and degree of differentiation of a rectangular input pulse to a maximum delay time determined by the differential triggering of a pair of parallel delay devices controlled respectively by the leading and trailing edge of an applied pulse which is to be delayed.

The above-mentioned and other features and objects of this invention will become apparent by reference to the following description taken in conjunction with the accompanying drawings, wherein.

Figure 1:
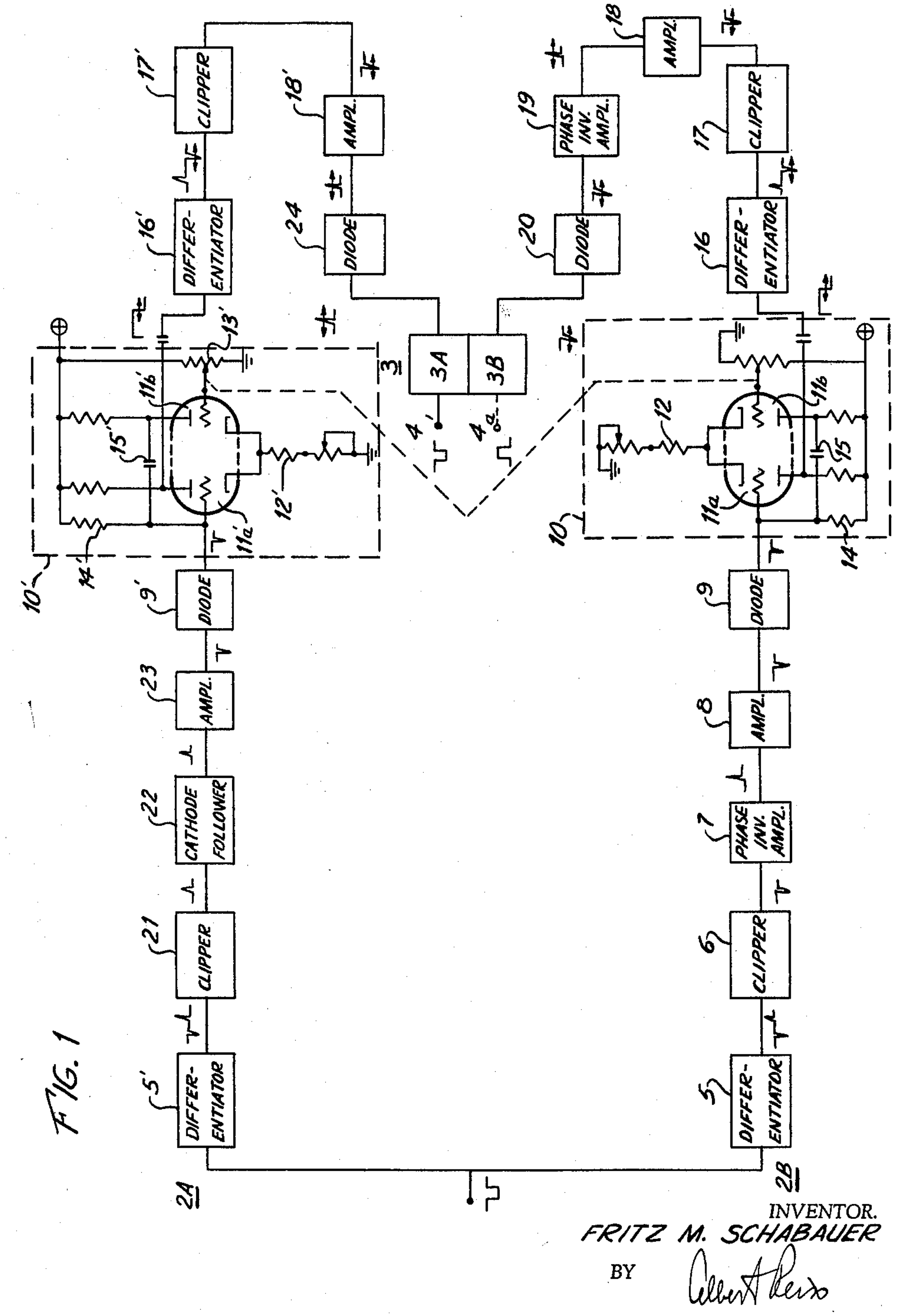
Fig. 1 is a block and schematic diagram of the invention.

Referring now to Fig. 1 there is shown, partly in block diagram and schematic form, the inventive circuit. Elements which are well known are shown by numbered and labelled rectangles. An input pulse which it is desired to delay may be applied to an input terminal 1. This pulse is shown as a negative-going pulse, but it should be understood that this circuit may be similarly adapted to handle positive-going pulses. The applied pulse is applied simultaneously to two parallel channels 2A and 2B, which channels have an output adapted to control a switch element 3 from which a regenerated output pulse is derived at the output terminals 4 or 4*a*. This regenerated pulse if taken from the terminal 4 has the same characteristics as the applied pulse and is delayed in time thereover by an amount equal to the delay characteristics of the channels 2A and 2B. Conversely, if the regenerated pulse is taken from the terminal 4*a*, it will have the same characteristics as the pulse taken from terminal 4 with the exception that it is of reverse polarity.

The channel 2B will now be described, and as is shown in Fig. 1, consists of a known type of differentiating circuit 5, the output of which is coupled to a clipping stage 6 by means of which the positive peak of the pulse is clipped. The negative peak which has been derived from the leading edge of the applied input pulse is passed to a phase-inverter amplifier 7 to invert the negative pulse. Thus, a positive pulse is extracted from amplifier 7 which substantially coincides with the leading edge of the applied input pulse. This positive pulse is passed to amplifier 8 to build up the amplitude of the pulse and the phase of the pulse is again reversed, due to the amplifier action so that the output of amplifier 8 is a negative pulse of increased amplitude and which substantially coincides with the leading edge of the applied input pulse. The pulse derived from amplifier 8 is applied to a unidirectional device 9 which is poled to accept a negative-going pulse only. The output of the device 9 is applied to a delay multi-vibrator stage 10 whose elements are schematically shown for better understanding of the invention. The delay multi-vibrator 10 is shown to consist of a dual triode 11A and 11B, the grid of the triode 11A being coupled to the output of the device 9 and being adapted to receive negative pulses therefrom. It will be understood, however, that the invention is not limited to a delay multi-vibrator; it being within the scope of this invention to substitute therefor any known delay devices such as a Miller integrator, a Phantastron, Sanatron, etc. The cathodes of the triodes 11A and 11B are connected together to a common cathode resistor 12. The grid of triode 11B is supplied with a fixed amount of bias via the resistor network of which potentiometer 13 is the element of interest. The grid of triode 11A is also biassed by a resistor 14, and the parameters of the circuit are such that the triode 11A is maintained normally conducting. The arrival of a negative pulse from the device 9 tends to decrease the current drawn by triode 11A and, consequently, the positive voltage appearing at the cathodes of the triodes decreases. As a result, triode 11B starts to conduct and a negative pulse is applied over the condenser 15 to the grid of the triode 11A and which tends to sharply cut off the triode 11A which produces a square positive pulse which pulse is applied to the differentiating circuit 16. The differentiating circuit 16 produces positive and negative pulses from the leading and trailing edges of the square pulse derived from the anode of the triode 11A. The time constant of the RC network composed of condenser 15 and resistance 14 together with the value of the control voltage applied to the grid of triode 11B by means of the potentiometer 13, determines the pulse length or delay of the square positive pulse which is derived from the anode of triode 11A, the delay being relatively linear and dependent upon the setting of the linear potentiometer 13. Thus far, it will be seen how a control pulse has been derived from the leading edge of the original applied input pulse, the control pulse having a length which is variable or, stated in other words, its trailing edge can be delayed by the setting of potentiometer 13 and the choice of circuit constants of elements 14 and 15, respectively.

Returning to the further description of channel 2B, the negative pulse derived from the differentiating circuit 16 is applied to a clipper 17. The clipper is adapted to clip the positive peak and to pass the negative peak. The output of the clipper 17 is applied to an amplifier 18 to increase the amplitude of the control pulse. Amplifier 18 shifts the phase of the negative pulse so that the output of the amplifier is a positive pulse which is applied to a phase-inverting amplifier stage 19, from which is derived an amplified negative-going pulse.

The output of amplifier 19 is applied to a unidirectional device 20 which is poled to pass negative pulses only. The device 20 is coupled to an input of the bistable multi-vibrator 3. The multi-vibrator consists of sections 3A and 3B and it is assumed that the section 3B is normally conducting. The application of the negative pulse derived from device 20 will cause the section 3B to cut off, and the leading edge of a negative-going pulse will appear at the output terminal 4.

Figure 2:
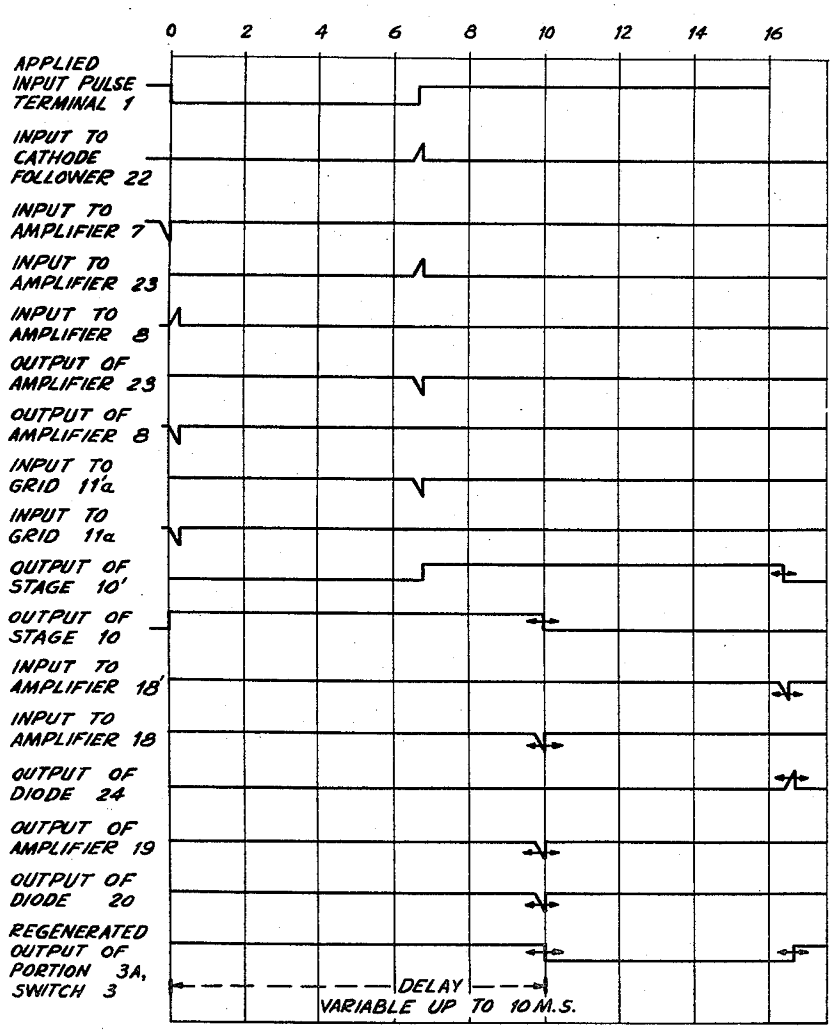
Figs. 2 and 3 are wave-form charts of the operation of the invention.

Channel 2A consists of many elements which are identical with those described in channel 2B. Those elements which are identical will be marked with identical reference numerals along with prime designations and will not be further described. The applied input pulse is passed to differentiator 5′ from which is derived a differentiated pulse having negative and positive peaks, respectively. The clipper 21 differs from the clipper 6 in that the clipper 21 clips the negative peak of the differentiated pulse and passes the positive peak only. This positive peak coincides with the trailing edge of the applied input pulse at terminal 1. The output of clipper 21 is applied to a cathode-follower stage 22, and the output of stage 22 is applied to amplifier 23 where a phase reversal is achieved and a negative trigger pulse is derived. The output of amplifier 23 is passed through unidirectional device 9′ and which device is poled to pass negative pulses only. The output of device 9′ is applied to a delay multi-vibrator stage 10′, and which stage corresponds to the stage 10 of channel 2B. The output of stage 10 is a square positive pulse whose trailing edge may be varied by the setting of the potentiometer 13′, as described in connection with the description of stage 10. As thus far explained, the function of both branches 2A and 2B is the same, disregarding, of course, the phasing of the trigger pulses, but with the exception that the variable delayed or trailing edges of the pulses derived from the stages 10 and 10′ are offset with respect to each other, corresponding to a time interval equal to the duration of the original applied pulse. According to the chart shown in Fig. 2, an applied input pulse having a duration of 6.6 milli-seconds results in the derivation of control pulses from the stages 10 and 10′ whose trailing edges are differentially spaced by 6.6 milli-seconds, the exact duration of the original applied input pulse.

It has been found advisable to couple the control potentiometer 13 and 13′ to a common shaft indicated by the dash line in Fig. 1 so that it is possible to shift both delayed trailing edges of the control pulses in respective stages 10 and 10′. Independent control of potentiometers 13 and 13′ may be resorted to, however, and will result in a change of the mark/space ratio of the delayed regenerated output pulse. To continue with the description of the operation of branch 2A, the trailing edge of the output control pulse derived from stage 10′, is applied to a differentiating circuit 16′, which circuit is adapted to produce positive and negative peaks, respectively, from the trailing edge of the square-wave positive pulse derived from stage 10′. The differentiated control pulse is applied to clipper 17′ and only the negative peak thereof is passed therethrough. The clipped negative peak is applied to amplifier 18′ resulting in a reversal of phase of the control pulse thus far derived in branch 2A. The output of amplifier 18′ is applied to unidirectional device 24, which device is poled oppositely to the direction of polarity of the device 20 so that only positive pulses are passed by device 24. Device 24 is coupled to the input of section 3A of the switch element 3 causing it to reconduct and causing the section 3B to cease conducting, and also causing the regenerated pulse appearing at the output 4 to be terminated. Thus, the output pulse will have a trailing edge at a time delayed under control of the branch 2A and determined by the duration of the applied input pulse.

The amount of delay that may be achieved is limited by the length of and the interval between applied input pulses. If the delay exceeds the last mentioned values, the delay stages 10, 10′ would be re-triggered by negative-going pulses derived from a newly-applied input pulse before they operate to deliver pulses to the switching element 3 indicative of the leading and trailing edges of the originally applied input pulse.

Figure 3:
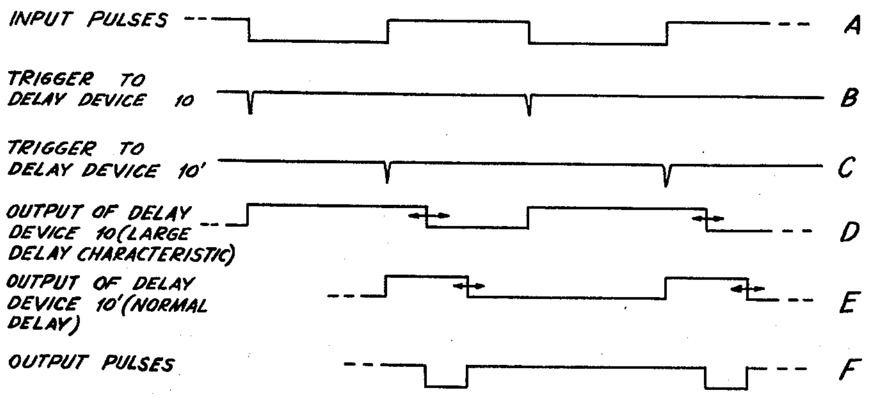

Within the proscription set forth in the previous paragraph, however, it is within the purview of my invention to independently vary the delay characteristics of the delay stages 10, 10′, and while I have shown the ganged control of potentiometers 13, 13′ thereof, it should be understood that they may be so varied. By providing different delay characteristics in said delay stages, the switch element 3 may be caused to deliver a delayed output pulse having a different mark/space ratio as compared to an originally applied input pulse. If the delay of the stage 10′ exceeds that of the stage 10 due to the different settings of the potentiometers 13 and 13′, respectively, the mark/space ratio of the output pulse derived at terminal 4 will be as shown in curve F, in Fig. 3. The output pulses of curve F have their leading edges coincident with the trailing edges of control pulses in curve D and their trailing edges coincident with the trailing edges of the control pulses in curve E. It will be noted that the pulses of curve F occur during the inter-pulse time of the applied input pulses of curve A. The trigger pulses of curves B and C are applied respectively to the delay stages 10′ and 10 and coincide with the leading and trailing edges, respectively, of the input pulses of curve A.

Figure 4:
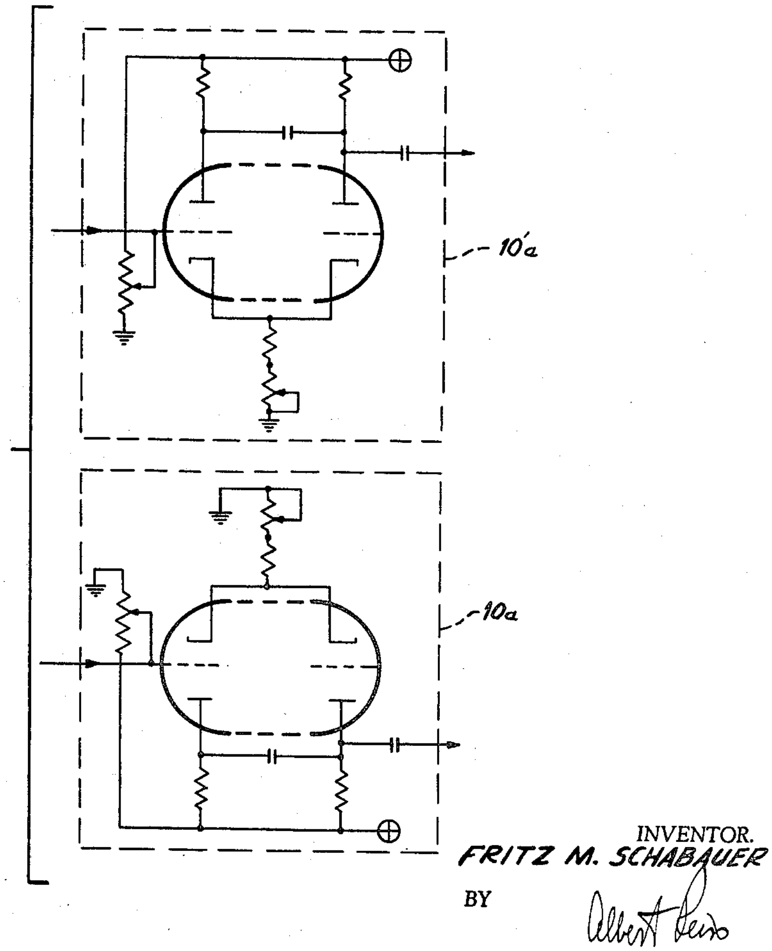
Fig. 4 is an alternative arrangement of a part of the circuit of Fig. 1.

It should be understood further that the invention is not limited to the production of negative-going pulses. By taking an output from stage 3B at terminal 4*a* (shown in dotted line in Fig. 1), pulses having a polarity opposite to the polarity of the applied input pulses may be derived. It is also possible to modify the delay stages so that the left-hand sections thereof are controlled by potentiometers as shown in Fig. 4, where only the input and output of the stages 10*a* and 10′*a* are shown. These stages are the mirror images of the stages 10 and 10′ of Fig. 1, the potentiometers 13*a* and 13′*a* now controlling the delay characteristics of the respective stages. In the showing of Fig. 4, the delayed output is extracted from the anode of the right-hand tubes of stages 10*a* and 10′*a* respectively. All circuitry associated with the delay stages 10*a* and 10′*a* is otherwise similar to that shown in Fig. 1.

If additional delay is desired, the output at terminal 4 may be applied to a similar delay circuit so as to achieve an additional delay, if necessary.

By providing heavy decoupling in most stages of the branches 2A and 2B, interaction is avoided and stable operation is assured. The circuit is particularly independent of line voltage variations. The arrangement disclosed, provides a reliable means for deriving a pair of control pulses from an applied input pulse—one negative, obtained from the leading edge of the input pulse, and the other a positive pulse derived from the trailing edge of the original pulse, and wherein both control pulses may be shifted simultaneously along a time axis to control a pulse regenerator as described above.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for variably delaying and regenerating an applied electrical pulse comprising two channels for deriving a pair of similar control pulses with a spacing corresponding to the leading and trailing edges, respectively, of said applied pulse, each of said channels including first and second amplifiers, said first amplifiers having high input impedances, one of said first amplifiers having a low and the other a high output impedance, said second amplifiers coupled in tandem to said first amplifiers respectively, a pair of identical variable delay devices having like input terminals, means for applying said control pulses to said input terminals, respectively, said devices responsive respectively to said control pulses, means for adjusting the delay characteristics of each of said delay devices whereby the pulses respectively derived therefrom are differentially spaced an interval corresponding to the interval between the leading and trailing edges, respectively of said applied pulse, and a pulse regenerating circuit responsive to said differentially spaced control pulses for producing a regenerated output pulse.

2. Apparatus as claimed in claim 1 wherein each of said variable delay devices comprises a delay multivibrator having an adjustable time constant network, each multivibrator adapted to delay a different one of said control pulses.

3. Apparatus as claimed in claim 2 wherein each of said adjustable time constant networks comprises an adjustable resistance-capacity network and a common control for simultaneously adjusting said networks.

4. Apparatus for variably delaying and regenerating an applied electrical pulse comprising a pulse input terminal, pulse regenerating means, a regenerated pulse output terminal coupled to said regenerating means, a pair of parallel control circuits for controlling operation of said regenerating means, said control circuits disposed between said input terminal and said regenerating means, a first of said control circuits comprising a first differentiating and clipping circuit for deriving a positive control pulse from the trailing edge of an applied pulse, a first amplifier, having a high input impedance coupled to said first differentiating circuit, a second amplifier coupled to said first amplifier at a point of low impedance, said second amplifier adapted to invert the phase of said positive control pulse, a first two-terminal unidirectional device having one terminal coupled to the output of said second amplifier and poled in a manner to pass pulses of negative polarity only, a first delay cathode-coupled multivibrator stage having an input coupled to the other terminal of said first unidirectional device, said first multivibrator stage having a first adjustable delay network whereby a first square control pulse is derived having a length determined by said first delay network, a second differentiating and clipping circuit coupled to said first multivibrator stage for deriving a negative pulse from the trailing edge of said first square pulse, a third amplifier having an input coupled to said second differentiating and clipping circuit, said amplifier adapted to invert the phase of said last-mentioned negative pulse, a second two-terminal unidirectional device having one terminal coupled to the output of said third amplifier and poled in a manner to pass pulses of positive polarity only, the other terminal of said second unidirectional device coupled to said regenerating means to cause the onset of a regenerated pulse having the same polarity as said applied pulse, said other control circuit comprising a third differentiating and clipping circuit for deriving a negative control pulse from the leading edge of said applied pulse, a fourth amplifier having an input coupled to said differentiating circuit for inverting the phase of said negative control pulse, a fifth amplifier having an input coupled to the output of said fourth amplifier, said fifth amplifier adapted to invert the phase of the pulse derived from said fourth amplifier, a third two-terminal unidirectional device having one terminal coupled to the output of said fifth amplifier and poled in a manner to pass pulses of negative polarity only, a second delay cathode-coupled multivibrator stage having an input coupled to the other terminal of said third unidirectional device, said second multivibrator stage having a second adjustable delay network whereby a second square control pulse is derived having a length determined by said second delay network, a fourth differentiating and clipping circuit coupled to said second multivibrator stage for deriving a negative pulse from the trailing edge of said second square pulse, a sixth amplifier coupled to said fourth differentiating circuit for amplifying said last-mentioned negative pulse, a seventh amplifier coupled to said sixth amplifier for inverting the phase of said amplified pulse, a fourth two terminal unidirectional device having one terminal coupled to the output of said seventh amplifier and poled in a manner to pass pulses of negative polarity only, the other terminal of said fourth unidirectional device coupled to said regenerating means to cause the termination of said regenerated pulse, and common ganging means for ganging control of both said adjustable delay networks.

References Cited in the file of this patent

UNITED STATES PATENTS

| | | |
|---|---|---|
| 2,560,600 | Schafer | July 17, 1951 |
| 2,716,189 | Ayres | Aug. 23, 1955 |
| 2,794,123 | Younker | May 28, 1957 |